P. E. BECKER.
DIE STOCK.
APPLICATION FILED JAN. 31, 1913.
1,062,317.
Patented May 20, 1913.
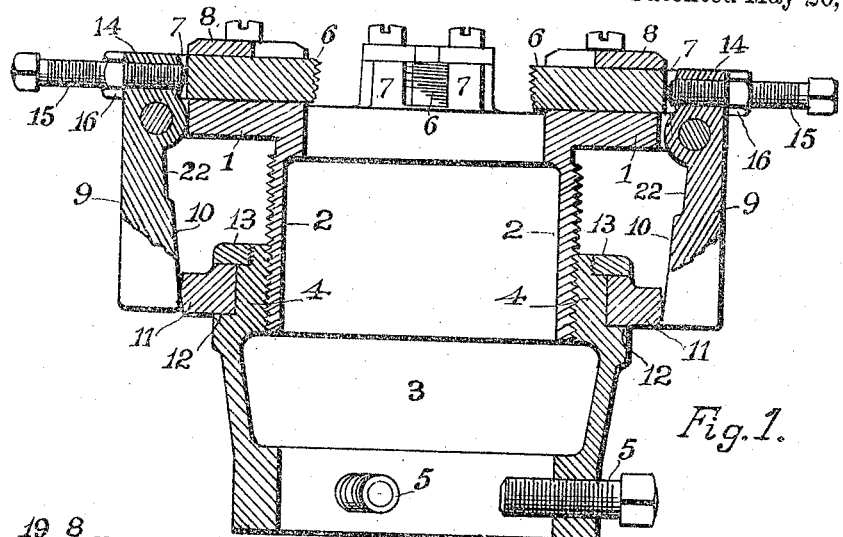
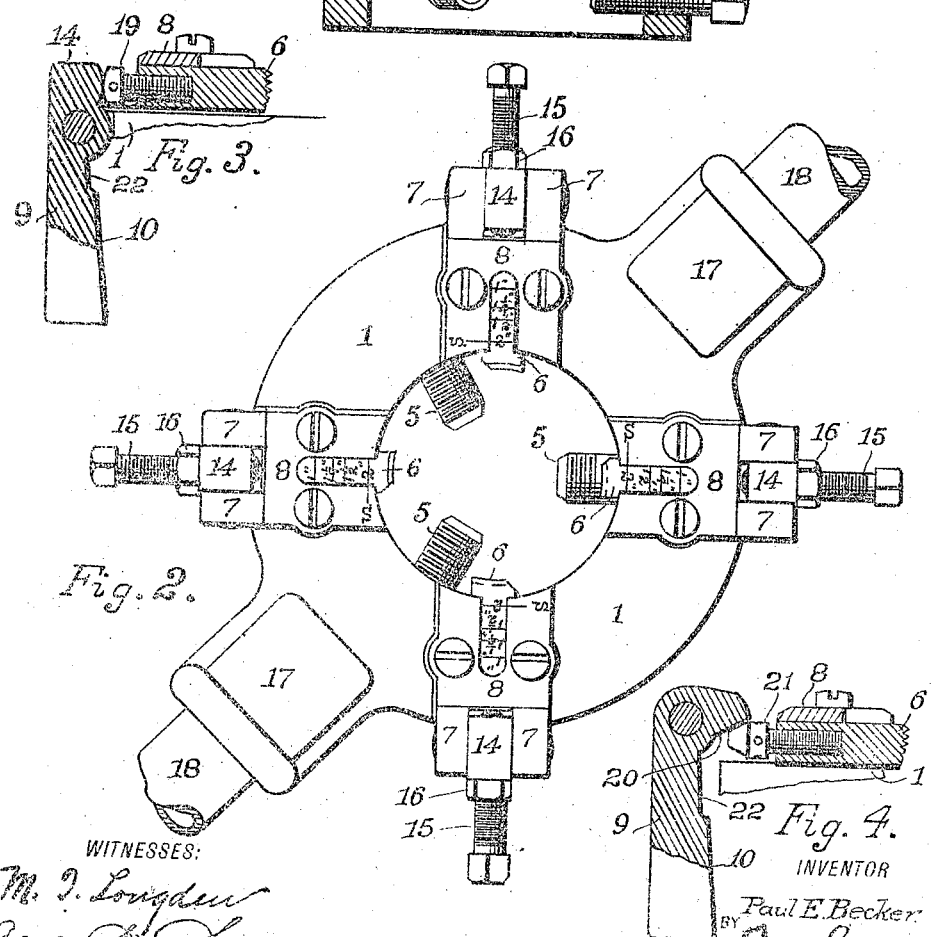
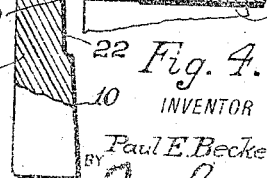
WITNESSES:
INVENTOR
Paul E. Becker
BY
ATTORNEY

UNITED STATES PATENT OFFICE.

PAUL E. BECKER, OF BRIDGEPORT, CONNECTICUT, ASSIGNOR TO THE HANDY MANUFACTURING COMPANY, OF BRIDGEPORT, CONNECTICUT, A CORPORATION OF CONNECTICUT.

DIE-STOCK.

1,062,317.   Specification of Letters Patent.   Patented May 20, 1913.

Application filed January 31, 1913. Serial No. 745,461.

*To all whom it may concern:*

Be it known that I, PAUL E. BECKER, a citizen of the United States, residing in the city of Bridgeport, county of Fairfield, State of Connecticut, have invented certain new and useful Improvements in Die-Stocks; and I do declare the following to be a full, clear, and exact description of the invention, such as will enable others skilled in the art to which it appertains to make and use the same.

My invention relates to certain new and useful improvements in die stocks, but more particularly has reference to devices of this description in which means are employed for automatically controlling the dies so that they will cut a tapered thread.

The object of my improvement is to provide simple and efficient means for controlling the movement of the dies, and to avoid the use of cams in connection with the tapered element that immediately controls the radial movements of the dies.

With these ends in view my invention consists in certain details of construction and combination of parts hereinafter fully described and then particularly pointed out in the claims which conclude this description.

Die stocks of this description usually comprise a stationary work holder and a rotary die carrying head movably arranged with respect to such holder, so that during the operation of the device the die carrying head gradually approaches or recedes from the work holder. It has been customary to provide the die carrying head with a lead screw which is engaged with a thread cut on the work holder so that the die carrying head is positively caused to approach or recede from the work holder. Also, in machine for cutting threads, such lead screw has been eliminated, and the die carrying head has been so supported and guided by the work holder that such head is capable of free and unobstructed movements toward and away from the work holder, and the dies themselves have been so constructed that they will lead themselves on to the work in advance of the desired threading operation.

My improvement has nothing to do with any particular style of die stock and may be utilized with or without a lead screw and is not limited to the use of any special nature of cutting dies.

In the accompanying drawing Figure 1 is a sectional elevation of my improved die stock—Fig. 2 a front elevation thereof—Fig. 3 a detail sectional elevation showing a modification of my invention so far as adjustable abutments between the dies and levers are concerned, and Fig. 4 is a detail sectional elevation illustrating a further modification of my invention with respect to the receding surfaces of the levers.

Similar numerals of reference denote like parts in the several figures of the drawing.

1 is the die carrying head or body which is preferably provided with a lead screw extension 2, and 3 is the work holder which is preferably provided with a circular interiorly threaded extension 4 with which latter the lead screw 2 engages. The work holder is very ordinary in construction and is tubular so that the pipe or other work to be threaded may be passed through it and secured by any suitable means such as clamping screws 5.

6 are the thread cutting dies which are radially disposed on the outside of the head 1 and guided within housings 7 rigid with said head, these dies being capable of free inward and outward movements. The dies are retained as against displacement by ordinary cover plates 8 secured to the housings.

9 are levers which are pivoted to the head 1 in planes which are at the rear of the outer ends of the dies and on the inner edges of these levers are inclines 10 which are engaged by a circular element supported by the work holder 4, this element being in the form of a ring 11 whose face is comparatively narrow with respect to the length of said inclines, said ring being preferably supported around the work holder so as to be capable of independent rotation, and retained as against lateral movement by means of a shouldered portion 12 formed on the work holder and a nut 13 driven on the work holder. At Fig. 1 I have shown these levers provided with portions 14 that extend upwardly beyond the pivotal points of the levers, and through these portions adjusting screws 15 are driven against the inner ends of which the dies abut, these screws being secured in any suitable adjustment by means of lock nuts 16.

17 are sockets preferably integral with the head 1, within which sockets suitable handles 18 may be placed for the purpose of conveniently revolving the head by hand.

As the die carrying head is revolved for the purpose of causing the dies to perform their functions, such head will gradually approach the work holder and the inclines 10 are of such a nature that, as they travel across the surface of the ring 11 during this movement of the die carrying head, the lower parts of these levers below their pivotal points will be forced inwardly and kept in constant contact with the surface of the ring 11, owing to the fact that the threading dies are in abutment with the ends of the adjusting screws 15 and are constantly receding from the work as different parts of these inclines successively travel across the surface of the ring 11. Since the ring 11 is quite narrow and has no function whatever except that of a mere passive contacting shoulder or protuberance, the inclines 10 will have only a limited contact against said ring, and, as the die carrying head 1 moves toward or away from the work-carrier, different portions of said inclines will be brought successively into and out of contact with this ring 11, and therefore the friction or bearing area between said inclines and ring 11 will be minimized. Therefore, it will be clearly understood, that, as the lower portions of these levers swing inwardly, the surfaces in contact with the rear of the dies will have a tendency to recede from the dies, but that the latter will receive an end thrust during their operation on the work which will cause them to follow up these receding movements and always contact with the receding surfaces carried by these levers.

Of course the dies may abut directly against the levers without any intervening adjustable abutments whatsoever, and I therefore do not wish to be limited in this respect, but I prefer to employ such abutments since the dies can thereby be adjusted to cut tapered threads on several sizes of work.

Referring more particularly to Fig. 2 it will be noted that the dies are provided with a scale marked 1″, 1¼″, 1½″, 2″, and that the cover plates are marked with index lines denoted by the letter S, which signifies that these dies may be adjusted normally so that they will cut tapered threads on work ranging from 1″ to 2″ in diameter, the dies in the instance shown being adjusted to cut threads on 2″ work.

Instead of equipping the levers with the adjustable abutments, the latter may be carried by the dies themselves, as is illustrated at Fig. 3, where one of the dies is shown with an adjusting screw 19 driven therein. Also, it is not necessary that the levers should be provided with the upward extensions 14 in order to provide for receding contact surfaces, since such levers may be formed with inclined contact surfaces at a point below the axis of the pivots of these levers, as is shown at Fig. 4 where one of the levers is illustrated as provided with an inclined surface 20 against which an adjusting screw 21 carried by the die abuts, and it will be readily understood that as the lower portion of this lever swings inwardly this incline 20 will be elevated thus permitting the gradual receding movement of the die. To be more explicit, still referring to Fig. 4, it will be clear, that the inclines 10 are so slight that the lower extremities of the levers 9 will have only a slight swinging movement, which is in reality about one-sixteenth of an inch, since the actual taper of the thread is quite slight, and therefore the upper ends of these levers will have a still slighter movement; accordingly, as the inclines 10 travel across the contact surfaces of the ring 11 during the thread cutting operation of the dies the inclined portion 20 will be slightly raised away from the end of the abutment 21 carried by the dies, but the end thrust of the dies themselves will cause such abutment to follow up the incline 20 so as to be constantly in contact therewith as said incline is gradually elevated.

It will now be clear that there are no cams whatsoever utilized in carrying out my improvement, and that the contacting surface of the ring 11 is perfectly plain and is passive in its coöperation with the inclined portions 10.

I preferably provide recessed portions 22 at the ends of the inclines 10, so that when said portions come opposite the ring 11 the levers may swing so as to withdraw the dies completely from the thread that has been cut, thus enabling the work to be removed without the necessity of backing the dies off the threads.

While I prefer that the ring 11 shall be capable of rotation, I do not wish to be limited in this respect since such ring has no extended contact with the inclines and therefore it may be stationary in all respects without departing from the spirit of my invention.

I claim:

1. A die stock, comprising a work holder, a die carrying head supported by and movably guided toward and away from said holder, thread cutting dies slidably carried by said head, levers pivoted to said head and having surfaces which recede as the dies perform their functions against which surfaces said dies abut, said levers having extensions which are provided with inclines on their inner edges, and an annular element having a minimized contact with said inclines which contact is constant owing to the thrust of the dies against such levers during the thread cutting operation.

2. A die stock, comprising a work holder, a die carrying head supported by and movably guided toward and away from said holder, thread cutting dies slidably carried by said head, levers pivoted to said head and having upward extensions beyond their pivotal points against which extensions the rear ends of said dies abut; said levers also having downward extensions beyond their pivotal points which extensions are provided with inclines on their inner edges, and a comparatively narrow annular protuberance carried by the work holder and stationary as to lateral movement, with which protuberance different portions of said inclines are successively brought into minimized contact during inward or outward movement of the die carrying head.

In testimony whereof I affix my signature in presence of two witnesses.

PAUL E. BECKER.

Witnesses:
F. W. SMITH, Jr.,
M. T. LONGDEN.